US012293365B2

(12) United States Patent
Starr et al.

(10) Patent No.: US 12,293,365 B2
(45) Date of Patent: *May 6, 2025

(54) AUTHENTICATION BASED ON BIOMETRIC IDENTIFICATION PARAMETER OF AN INDIVIDUAL FOR PAYMENT TRANSACTION

(71) Applicant: Visa International Service Association, San Francisco, CA (US)

(72) Inventors: Elianna Starr, San Francisco, CA (US); Dennis Franklin Olson, San Francisco, CA (US); Amy Dawson, San Francisco, CA (US); Andres Jimenez, Walnut Creek, CA (US); Jiayun He, San Francisco, CA (US); Amisha Sisodiya, San Francisco, CA (US); Jorge Andre Torres Perez Palacios, San Francisco, CA (US); Binoy Parag Parikh, Foster City, CA (US); Saloni Vijaykumar Mahajan, Fremont, CA (US); Sowmya Vuddaraju, Fremont, CA (US); Sneha Sri Tadepalli, Fremont, CA (US); Lacey Best-Rowden, San Mateo, CA (US); Kim R. Wagner, Sunnyvale, CA (US); Sunpreet Singh Arora, San Jose, CA (US); Sunit Lohtia, San Rafael, CA (US); John F. Sheets, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,974

(22) Filed: Feb. 15, 2023

(65) Prior Publication Data

US 2023/0196366 A1    Jun. 22, 2023

Related U.S. Application Data

(63) Continuation of application No. 17/551,492, filed on Dec. 15, 2021, now Pat. No. 11,593,809, which is a
(Continued)

(51) Int. Cl.
*G06Q 20/40* (2012.01)
*G06Q 20/32* (2012.01)
(Continued)

(52) U.S. Cl.
CPC ....... *G06Q 20/40145* (2013.01); *G06Q 20/32* (2013.01); *G06Q 20/3278* (2013.01);
(Continued)

(58) Field of Classification Search
CPC ................................................ G06Q 20/40145
See application file for complete search history.

(56) References Cited

U.S. PATENT DOCUMENTS 5,177,342 A * 1/1993 Adams ............... G06Q 20/4037
340/5.4
8,577,810 B1 11/2013 Dalit et al.
(Continued)

FOREIGN PATENT DOCUMENTS

CN    103731271 A      4/2014
CN    103731271 B  *   6/2017
(Continued)

OTHER PUBLICATIONS

"Singh et al., Secure swipe machine with help of biometric security, Nov. 24, 2016, IEEE Xplore, entire document" (Year: 2016).*
(Continued)

*Primary Examiner* — Abhishek Vyas
*Assistant Examiner* — Adam Hilmantel

(74) *Attorney, Agent, or Firm* — The Webb Law Firm

(57) ABSTRACT

Provided is a computer-implemented method for authenticating a customer during payment transactions based on biometric identification parameters of the customer that includes receiving image data associated with an image template for identification of a customer, receiving image data associated with an image of a biometric identification parameter of the customer during a payment transaction between the customer and a merchant, establishing a short-range communication connection with a user device associated with the customer during the payment transaction between the customer and the merchant, authenticating an identity of the customer for the payment transaction via the short-range communication connection, determining an account identifier of an account of the customer based on authenticating the identity of the customer for the payment transaction, and processing the payment transaction using the account identifier of the account of the customer. A system and computer program product are also disclosed.

19 Claims, 4 Drawing Sheets

Related U.S. Application Data continuation of application No. 16/245,316, filed on Jan. 11, 2019, now Pat. No. 11,232,450.

(60) Provisional application No. 62/616,484, filed on Jan. 12, 2018.

(51) Int. Cl.
*G06Q 20/42* (2012.01)
*G06V 40/16* (2022.01)

(52) U.S. Cl.
CPC .......... *G06Q 20/42* (2013.01); *G06V 40/172* (2022.01); *G06Q 20/326* (2020.05)

(56) References Cited

U.S. PATENT DOCUMENTS

| | | | |
|---|---|---|---|
| 2011/0087611 A1* | 4/2011 | Chetal | G06Q 50/265 705/325 |
| 2014/0136419 A1 | 5/2014 | Kiyohara | |
| 2014/0325230 A1* | 10/2014 | Sy | H04L 9/3231 713/171 |
| 2014/0337221 A1* | 11/2014 | Hoyos | G06Q 20/3276 705/44 |
| 2016/0086287 A1* | 3/2016 | Candelore | G06Q 40/12 705/30 |
| 2017/0193480 A1* | 7/2017 | Chandrasekaran | G06Q 20/206 |
| 2017/0255923 A1* | 9/2017 | Dieter | G06Q 20/204 |
| 2017/0323299 A1 | 11/2017 | Davis | |
| 2018/0260803 A1* | 9/2018 | Seol | H04M 1/72403 |
| 2022/0383325 A1* | 12/2022 | Hoffman | G06Q 20/4018 |

FOREIGN PATENT DOCUMENTS

| | | | | |
|---|---|---|---|---|
| CN | 107451816 A | * | 12/2017 | G06K 7/1413 |
| WO | WO-2016210332 A1 | * | 12/2016 | G06F 11/00 |
| WO | 2017075063 A1 | | 5/2017 | |
| WO | 2018174901 A1 | | 9/2018 | |
| WO | WO-2019132766 A1 | * | 7/2019 | G06Q 20/203 |

OTHER PUBLICATIONS

"Kiran et al., Reliable OSPM Schema for Secure Transaction using Mobile Agent in Micropayment System, Jan. 30, 2014, IEEE, entire document" (Year: 2014).*

Kiran et al., "Reliable OSPM Schema for Secure Transaction using Mobile Agent in Micropayment System," IEEE, Jan. 30, 2014, 6 pages.

* cited by examiner

AUTHENTICATION BASED ON BIOMETRIC IDENTIFICATION PARAMETER OF AN INDIVIDUAL FOR PAYMENT TRANSACTION

CROSS REFERENCE TO RELATED APPLICATIONS

This application is a continuation application of U.S. patent application Ser. No. 17/551,492, filed Dec. 15, 2021, which is a continuation application of U.S. patent application Ser. No. 16/245,316, filed Jan. 11, 2019, now issued as U.S. Pat. No. 11,232,450, which claims priority to U.S. Provisional Patent Application No. 62/616,484, filed Jan. 12, 2018, which are incorporated herein by reference in their entirety.

BACKGROUND

1. Technical Field

This present disclosure relates generally to authenticating an individual during a payment transaction and, in one particular embodiment, to a method, system, and computer program product for authenticating an individual during a payment transaction based on a biometric identification parameter of the individual.

2. Technical Considerations

A digital wallet may include an application on an electronic device (e.g., a smartphone) that allows a customer (e.g., a user, an individual, and/or the like) to conduct an electronic payment transaction. For example, an electronic payment transaction made using a digital wallet may include an online payment transaction (e.g., a card not present transaction) conducted by the customer involving items via the Internet with a computer and/or an in-store payment transaction (e.g., a card present payment transaction) conducted by the customer using a mobile device, such as a smartphone, with a credential (e.g., information associated with the account of the customer stored on the smartphone) to purchase an item at a merchant location (e.g., a store) of a merchant. The account (e.g., a credit account, a debit account, and/or the like) of the customer may be linked to the digital wallet and the credential associated with the account may be passed to a point-of-sale (POS) device (e.g., a POS terminal) of the merchant wirelessly via near-field communication (NFC).

However, the customer may still be required to present the mobile device within a short distance (e.g., a distance that is the maximum distance required to communicate via an NFC communication connection) of a POS device to authenticate the customer and conduct a payment transaction at the merchant location via NFC. For example, the customer may be required the remove the mobile device from their pocket and may be required to present the electronic device at a predetermined distance away from the POS device to conduct the payment transaction via NFC. In such an example, the time required for the customer to present the electronic device may require an amount of time that is undesirable to the customer and/or undesirable to other individuals at the merchant location that are also attempting to conduct payment transactions. In addition, the customer and/or other individuals may forego conducting a payment transaction at the merchant location based on the amount of time required for the user to present the electronic device.

SUMMARY

Accordingly, systems, devices, products, apparatuses, and/or methods for authenticating an individual during a payment transaction based on a biometric identification parameter of the individual are disclosed that overcome some or all of the deficiencies of the prior art.

According to a non-limiting embodiment, provided is a computer-implemented method for authenticating an individual during a payment transaction based on a biometric identification parameter of the individual. The method comprises receiving, with at least one processor, image data associated with an image template for identification of a customer, receiving, with at least one processor, image data associated with an image of a biometric identification parameter of the customer during a payment transaction between the customer and a merchant, establishing, with at least one processor, a short-range communication connection with a user device associated with the customer during the payment transaction between the customer and the merchant, authenticating, with at least one processor, an identity of the customer for the payment transaction via the short-range communication connection, wherein authenticating comprises: determining whether the image of the biometric identification parameter of the customer corresponds to the image template for identification of the customer, determining, with at least one processor, an account identifier of an account of the customer based on authenticating the identity of the customer for the payment transaction, and processing, by at least one processor, the payment transaction using the account identifier of the account of the customer.

According to another non-limiting embodiment, provided is a system for authenticating an individual during a payment transaction based on a biometric identification parameter of the individual. The system comprises at least one processor programmed or configured to receive image data associated with an image template for identification of a customer, receive image data associated with an image of a biometric identification parameter of the customer during a payment transaction between the customer and a merchant, establish a short-range communication connection with a user device associated with the customer during the payment transaction between the customer and the merchant, authenticate an identity of the customer for the payment transaction via the short-range communication connection, determine an account identifier of an account of the customer based on authenticating the identity of the customer for the payment transaction, and process the payment transaction using the account identifier of the account of the customer. Authenticating may include determining whether the image of the biometric identification parameter of the customer corresponds to the image template for identification of the customer.

According to a further non-limiting embodiment, provided is a computer program product for authenticating an individual during a payment transaction based on a biometric identification parameter of the individual. The computer program product comprises at least one non-transitory computer-readable medium including one or more instructions that, when executed by at least one processor, cause the at least one processor to receive image data associated with an image template for identification of a customer, receive image data associated with an image of a biometric identification parameter of the customer during a payment transaction between the customer and a merchant, establish a short-range communication connection with a user device associated with the customer during the payment transaction between the customer and the merchant, authenticate an identity of the customer for the payment transaction via the short-range communication connection, determine an account identifier of an account of the customer based on authenticating the identity of the customer for the payment transaction, and process the payment transaction using the account identifier of the account of the customer. Authentication may comprise determining whether the image of the biometric identification parameter of the customer corresponds to the image template for identification of the customer.

Further embodiments or aspects are set forth in the following numbered clauses:

Clause 1: A computer-implemented method for authenticating a customer during a payment transaction based on a biometric identification parameter of the customer comprising: receiving, with at least one processor, image data associated with an image template for identification of a customer; receiving, with at least one processor, image data associated with an image of a biometric identification parameter of the customer during a payment transaction between the customer and a merchant; establishing, with at least one processor, a short-range communication connection with a user device associated with the customer during the payment transaction between the customer and the merchant; authenticating, with at least one processor, an identity of the customer for the payment transaction via the short-range communication connection, wherein authenticating comprises: determining whether the image of the biometric identification parameter of the customer corresponds to the image template for identification of the customer, determining, with at least one processor, an account identifier of an account of the customer based on authenticating the identity of the customer for the payment transaction; and processing, by at least one processor, the payment transaction using the account identifier of the account of the customer.

Clause 2: The computer-implemented method according to clause 1, further comprising: sending a transaction confirmation message to the user device associated with the customer, wherein the transaction confirmation message includes an indication that the payment transaction involving the customer was processed based on processing the payment transaction.

Clause 3: The computer-implemented method according to clauses 1 or 2, further comprising: displaying an image associated with a payment device, wherein the payment device is associated with the account identifier of the account of the customer based on determining the account identifier of the account of the customer; and receiving an indication that the account identifier of the account of the customer is to be used during processing of the payment transaction after displaying the image associated with the payment device.

Clause 4: The computer-implemented method according to any of clauses 1-3, wherein processing the payment transaction comprises: processing, by at least one processor, the payment transaction using the account identifier of the account of the customer based on receiving the indication that the account identifier of the account of the customer is to be used during processing of the payment transaction.

Clause 5: The computer-implemented method according to any of clauses 1-4, further comprising: sending a payment transaction authorization request message to the user device associated with the customer, wherein the payment transaction authorization request message comprises a transaction amount of the payment transaction; and receiving a payment transaction authorization response message from the user device associated with the customer, wherein the payment transaction authorization request message comprises authorization data associated with an indication that the customer authorizes the transaction amount of the payment transaction.

Clause 6: The computer-implemented method according to any of clauses 1-5, further comprising: causing an image of at least a portion of a face of the customer to be captured via an image capture device, wherein receiving the image data associated with the image of the biometric identification parameter of the customer comprises: receiving the image of at least a portion of the face of the customer from the image capture device.

Clause 7: The computer-implemented method according to any of clauses 1-6, wherein the image data associated with an image template for identification of the customer comprises encrypted image data associated with a facial image template of the customer, and wherein receiving the image data associated with an image template for identification of the customer comprises: receiving the encrypted image data associated with the facial image template of the customer from the user device associated with the customer, wherein the encrypted image data associated with the facial image template of the customer comprises data that has been encrypted using a homomorphic encryption scheme.

Clause 8: The computer-implemented method according to any of clauses 1-7, further comprising: receiving first data associated with a first device identifier of the user device associated with the customer via the short-range communication connection; storing the first data associated with the first device identifier of the user device associated with the customer and the image data associated with the image template for identification of the customer in a data structure; and receiving second data associated with a second device identifier of the user device associated with the customer via the short-range communication connection during the payment transaction, wherein authenticating the customer for the payment transaction comprises: determining whether the image of the biometric identification parameter of the customer corresponds to the image template for identification of the customer; and determining whether the first device identifier of the user device associated with the customer corresponds to the second device identifier of the user device associated with the customer.

Clause 9: The computer-implemented method according to any of clauses 1-8, further comprising: establishing the short-range communication connection with the user device associated with the customer based on the user device associated with the customer being within a predetermined distance of a point-of-sale (POS) device of the merchant.

Clause 10: A system for authenticating a customer during a payment transaction based on a biometric identification parameter of the customer, the system comprising: at least one processor programmed or configured to: receive image data associated with an image template for identification of a customer; receive image data associated with an image of a biometric identification parameter of the customer during a payment transaction between the customer and a merchant; establish a short-range communication connection with a user device associated with the customer during the payment transaction between the customer and the merchant; authenticate an identity of the customer for the payment transaction via the short-range communication connection, wherein, when authenticating the identity of the customer for the payment transaction, the at least one process is programmed or configured to: determine whether the image of the biometric identification parameter of the customer corresponds to the image template for identification of the customer, determine an account identifier of an account of the customer based on authenticating the identity of the customer for the payment transaction; and process the payment transaction using the account identifier of the account of the customer.

Clause 11: The system according to clause 10, wherein the at least one processor is further programmed or configured to: send a transaction confirmation message to the user device associated with the customer, wherein the transaction confirmation message includes an indication that the payment transaction involving the customer was processed based on processing the payment transaction.

Clause 12: The system according to clauses 10 or 11, wherein the at least one processor is further programmed or configured to: display an image associated with a payment device, wherein the payment device is associated with the account identifier of the account of the customer based on determining the account identifier of the account of the customer; and receive an indication that the account identifier of the account of the customer is to be used during processing of the payment transaction after displaying the image associated with the payment device.

Clause 13: The system according to any of clauses 10-12, wherein the at least one processor is further programmed or configured to: process the payment transaction using the account identifier of the account of the customer based on receiving the indication that the account identifier of the account of the customer is to be used during processing of the payment transaction.

Clause 14: The system according to any of clauses 10-13, wherein the at least one processor is further programmed or configured to: send a payment transaction authorization request message to the user device associated with the customer, wherein the payment transaction authorization request message comprises a transaction amount of the payment transaction; and receive a payment transaction authorization response message from the user device associated with the customer, wherein the payment transaction authorization request message comprises authorization data associated with an indication that the customer authorizes the transaction amount of the payment transaction.

Clause 15: The system according to any of clauses 10-14, wherein the at least one processor is further programmed or configured to: cause an image of at least a portion of a face of the customer to be captured via an image capture device, wherein, when receiving the image data associated with the image of the biometric identification parameter of the customer, at least one processor is programmed or configured to: receive the image of at least a portion of the face of the customer from the image capture device.

Clause 16: The system according to any of clauses 10-15, wherein the image data associated with an image template for identification of the customer comprises encrypted image data associated with a facial image template of the customer, and wherein, when receiving the image data associated with the image of the biometric identification parameter of the customer, at least one processor is programmed or configured to: receive the encrypted image data associated with the facial image template of the customer from the user device associated with the customer, wherein the encrypted image data associated with the facial image template of the customer comprises data that has been encrypted using a homomorphic encryption scheme.

Clause 17: The system according to any of clauses 10-16, wherein the at least one processor is further programmed or configured to: receive first data associated with a first device identifier of the user device associated with the customer; store the first data associated with the first device identifier of the user device associated with the customer and the image data associated with the image template for identification of the customer in a data structure; and receive second data associated with a second device identifier of the user device associated with the customer via the short-range communication connection during the payment transaction, wherein, when authenticating the customer for the payment transaction, the at least one processor is programmed or configured to: determine whether the image of the biometric identification parameter of the customer corresponds to the image template for identification of the customer; and determine whether the first device identifier of the user device associated with the customer corresponds to the second device identifier of the user device associated with the customer.

Clause 18: The system according to any of clauses 10-17, wherein the at least one processor is further programmed or configured to: establish the short-range communication connection with the user device associated with the customer based on the user device associated with the customer being within a predetermined distance of a point-of-sale (POS) device of the merchant.

Clause 19: A computer program product for authenticating a customer during a payment transaction based on a biometric identification parameter of the customer, the computer program product comprising at least one non-transitory computer-readable medium including one or more instructions that, when executed by at least one processor, cause the at least one processor to: receive image data associated with an image template for identification of a customer; receive image data associated with an image of a biometric identification parameter of the customer during a payment transaction between the customer and a merchant; establish a short-range communication connection with a user device associated with the customer during the payment transaction between the customer and the merchant; authenticate an identity of the customer for the payment transaction via the short-range communication connection, wherein the one or more instructions that cause the at least one processor to authenticate the identity of the customer for the payment transaction, cause the at least one processor to: determine whether the image of the biometric identification parameter of the customer corresponds to the image template for identification of a customer; determine an account identifier of an account of the customer based on authenticating the identity of the customer for the payment transaction; and process the payment transaction using the account identifier of the account of the customer.

Clause 20: The computer program product according to clause 19, wherein the one or more instructions further cause the at least one processor to: send a transaction confirmation message to the user device associated with the customer, wherein the transaction confirmation message includes an indication that the payment transaction involving the customer was processed based on processing the payment transaction.

Clause 21: The computer program product according to clauses 19 or 20, wherein the one or more instructions further cause the at least one processor to: display an image associated with a payment device, wherein the payment device is associated with the account identifier of the account of the customer based on determining the account identifier of the account of the customer; and receive an indication that the account identifier of the account of the customer is to be used during processing of the payment transaction after displaying the image associated with the payment device.

Clause 22: The computer program product according to any of clauses 19-21, wherein the one or more instructions further cause the at least one processor to: process the payment transaction using the account identifier of the account of the customer based on receiving the indication that the account identifier of the account of the customer is to be used during processing of the payment transaction.

Clause 23: The computer program product according to any of clauses 19-22, wherein the one or more instructions further cause the at least one processor to: send a payment transaction authorization request message to the user device associated with the customer, wherein the payment transaction authorization request message comprises a transaction amount of the payment transaction; and receive a payment transaction authorization response message from the user device associated with the customer, wherein the payment transaction authorization request message comprises authorization data associated with an indication that the customer authorizes the transaction amount of the payment transaction.

Clause 24: The computer program product according to any of clauses 19-23, wherein the one or more instructions further cause the at least one processor to: cause an image of at least a portion of a face of the customer to be captured via an image capture device, wherein receiving the image data associated with the image of the biometric identification parameter of the customer comprises: receiving the image of at least a portion of the face of the customer from the image capture device.

Clause 25: The computer program product according to any of clauses 19-24, wherein the image data associated with an image template for identification of the customer comprises encrypted image data associated with a facial image template of the customer, and wherein receiving the image data associated with an image template for identification of the customer comprises: receiving the encrypted image data associated with the facial image template of the customer from the user device associated with the customer, wherein the encrypted image data associated with the facial image template of the customer comprises data that has been encrypted using a homomorphic encryption scheme.

Clause 26: The computer program product according to any of clauses 19-25, wherein the one or more instructions further cause the at least one processor to: receive first data associated with a first device identifier of the user device associated with the customer via the short-range communication connection; store the first data associated with the first device identifier of the user device associated with the customer and the image data associated with the image template for identification of the customer in a data structure; and receive second data associated with a second device identifier of the user device associated with the customer via the short-range communication connection during the payment transaction, wherein authenticating the customer for the payment transaction comprises: determining whether the image of the biometric identification parameter of the customer corresponds to the image template for identification of the customer; and determining whether the first device identifier of the user device associated with the customer corresponds to the second device identifier of the user device associated with the customer.

Clause 27: The computer program product according to any of clauses 19-26, wherein the one or more instructions further cause the at least one processor to: establish the short-range communication connection with the user device associated with the customer based on the user device associated with the customer being within a predetermined distance of a POS device of the merchant.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
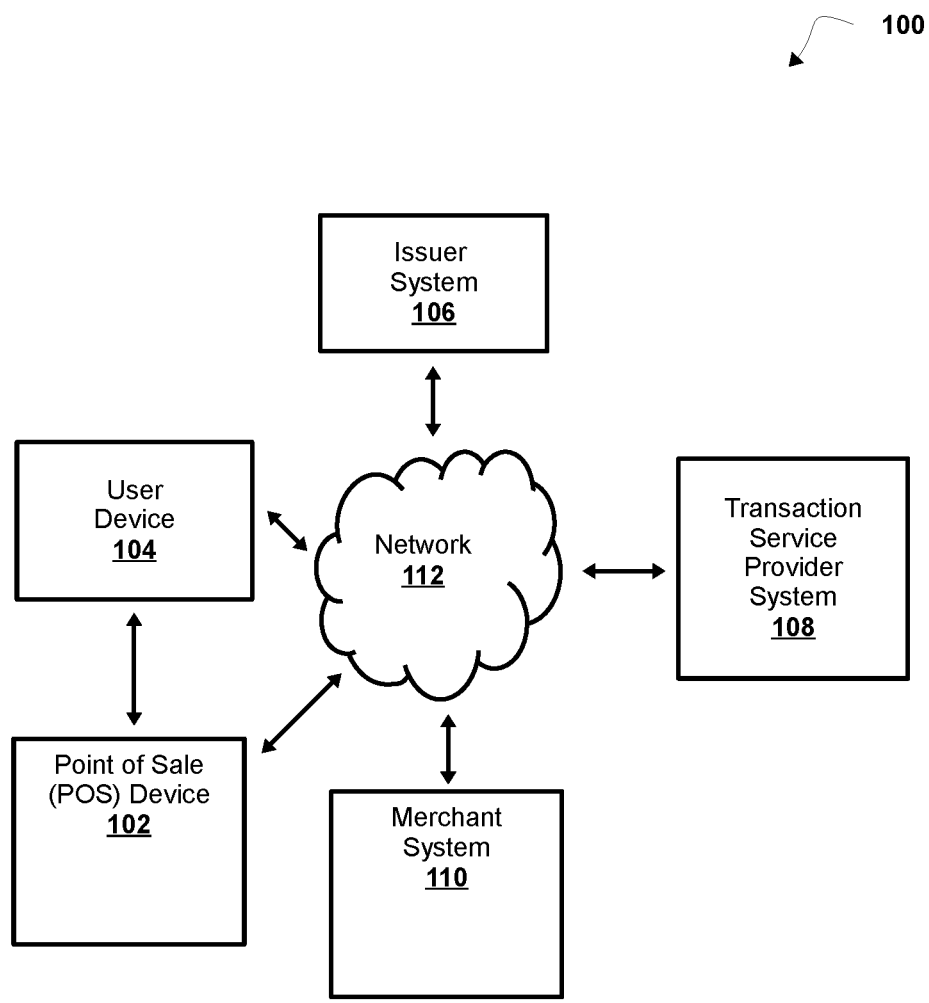
FIG. 1 is a diagram of a non-limiting embodiment of an environment in which systems, devices, products, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments, an issuer may provide an account identifier (e.g., a PAN, a token, and/or the like) to a user (e.g., an accountholder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments, the account identifier may be an original account identifier, where the original account identifier was provided to a user at the creation of the account associated with the account identifier. In some non-limiting embodiments, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier that is used as a substitute or replacement for another account identifier, such as a PAN. Tokens may be associated with a PAN or other original account identifier in one or more data structures (e.g., one or more databases and/or the like) such that they may be used to conduct a payment transaction without directly using the original account identifier. In some non-limiting embodiments, an original account identifier, such as a PAN, may be associated with a plurality of tokens for different individuals or purposes. In some non-limiting embodiments, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like.

As used herein, a "POS system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices including one or more software applications configured to facilitate and/or conduct transactions (e.g., payment transactions, electronic payment transactions, and/or the like). For example, an electronic wallet may include a user device (e.g., a mobile device) executing an application program, server-side software, and/or databases for maintaining and providing data to be used during a payment transaction to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Wallet™, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the terms "client" and "client device" may refer to one or more computing devices, such as processors, storage devices, and/or similar computer components, that access a service made available by a server. In some non-limiting embodiments, a "client device" may refer to one or more devices that facilitate payment transactions, such as POS devices and/or POS systems used by a merchant. In some non-limiting embodiments, a client device may include an electronic device configured to communicate with one or more networks and/or facilitate payment transactions such as, but not limited to, one or more desktop computers, one or more portable computers (e.g., tablet computers), one or more mobile devices (e.g., cellular phones, smartphones, PDAs, wearable devices, such as watches, glasses, lenses, and/or clothing, and/or the like), and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components, that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present disclosure are directed to systems, devices, products, apparatuses, and/or methods for authenticating a customer during a payment transaction based on a biometric identification parameter of the customer. According to non-limiting embodiments of the present disclosure, a customer involved in a payment transaction may not be required to present the customer's user device to conduct a payment transaction at a merchant location. Furthermore, an amount of time to conduct a payment transaction involving the customer is reduced based on the customer not being required to present the customer's user device or other payment device. In addition, the customer and/or other individuals may conduct additional payment transactions at the merchant location based on the reduced amount of time required to conduct the payment transaction involving the customer.

Referring now to FIG. 1, FIG. 1 is a diagram of an example environment 100 in which systems, devices, products, apparatuses, and/or methods, described herein, may be implemented. As shown in FIG. 1, environment 100 includes POS device 102, user device 104, issuer system 106, transaction service provider system 108, merchant system 110, and network 112.

POS device 102 may include one or more devices capable of receiving information from and/or sending information to user device 104, issuer system 106, transaction service provider system 108, and/or merchant system 110 via network 112. For example, POS device may include a client device and/or the like. In some non-limiting embodiments, POS device 102 may or may not be capable of receiving information (e.g., from user device 104) via a short-range communication connection (e.g., a short-range wireless communication connection, an NFC communication connection, an RFID communication connection, a Bluetooth® communication connection, a Bluetooth® Low Energy (BLE) communication connection, and/or the like), and/or communicating information (e.g., to user device 104) via a short-range communication connection. In some non-limiting embodiments, POS device 102 may include one or more devices capable of capturing an image of a biometric identification parameter of the customer. For example, POS device 102 may include an image capture device, such as a camera (e.g., a digital camera, a mobile device camera, and/or the like). In some non-limiting embodiments, functions of POS device 102 may be caused by a mobile application (e.g., a mobile payment application) stored on POS device 102. For example, POS device 102 may receive information, determine a result based on information, display information, and/or send information based on the mobile application causing POS device 102 to receive the information, determine the result based on the information, display the information, and/or send the information. In some non-limiting embodiments, the mobile application of POS device 102 may be controlled or operated by an issuer or a transaction service provider.

User device 104 may include one or more devices capable of receiving information from and/or sending information to POS device 102, issuer system 106, transaction service provider system 108, and/or merchant system 110 via network 112. For example, user device 104 may include a client device and/or the like. In some non-limiting embodiments, user device 104 may or may not be capable of receiving information (e.g., from merchant system 110) via a short-range communication connection (e.g., a short-range wireless communication connection, an NFC communication connection, an RFID communication connection, a Bluetooth® communication connection, a BLE communication connection, and/or the like), and/or communicating information (e.g., to POS device 102) via a short-range communication connection. In some non-limiting embodiments, functions of user device 104 may be caused by a mobile application (e.g., a mobile payment application) stored on user device 104. For example, user device 104 may receive information, determine a result based on information, and/or send information based on the mobile application causing user device 104 to receive the information, determine the result based on the information, and/or send the information. In some non-limiting embodiments, the mobile application of user device 104 may be controlled or operated by an issuer or a transaction service provider.

Issuer system 106 may include one or more devices capable of receiving information and/or sending information to POS device 102, user device 104, transaction service provider system 108, and/or merchant system 110 via network 112. For example, issuer system 106 may include a computing device, such as a server, a group of servers, and/or other like devices. In some non-limiting embodiments, issuer system 106 may be associated with an issuer institution as described herein. For example, issuer system 106 may be associated with an issuer institution that issued a credit account, debit account, credit card, debit card, and/or the like to a user associated with user device 104.

Transaction service provider system 108 may include one or more devices capable of receiving information from and/or sending information to POS device 102, user device 104, issuer system 106, and/or merchant system 110 via network 112. For example, transaction service provider system 108 may include a computing device, such as a server (e.g., a transaction processing server), a group of servers, and/or other like devices. In some non-limiting embodiments, transaction service provider system 108 may be associated with a transaction service provider as described herein.

Merchant system 110 may include one or more devices capable of receiving information from and/or sending information to POS device 102, user device 104, issuer system 106, and/or transaction service provider system 108 via network 112. In some non-limiting embodiments, merchant system 110 may include a computing device, such as a server, a group of servers, a client device, a group of client devices, and/or other like devices. In some non-limiting embodiments, merchant system 110 may include POS device 102. In some non-limiting embodiments, merchant system 110 may be associated with a merchant as described herein. In some non-limiting embodiments, merchant system 110 may include an acquirer system associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
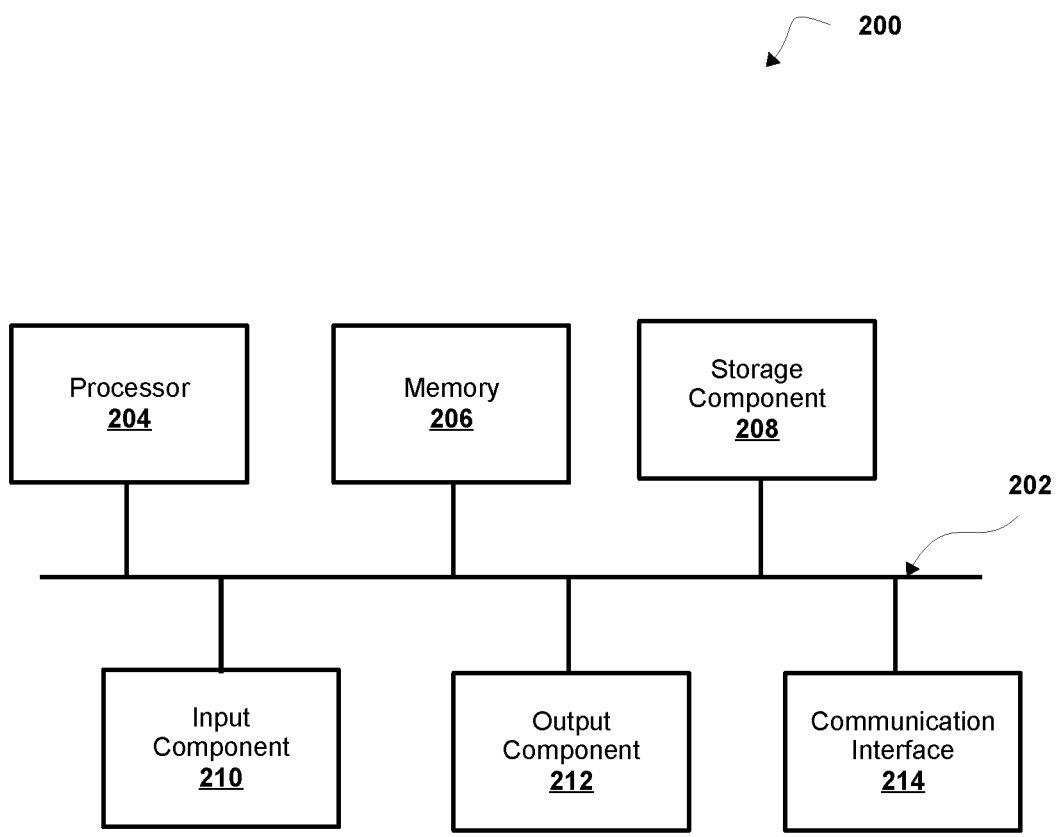
FIG. 2 is a diagram of a non-limiting embodiment of components of one or more devices of FIG. 1.

Referring now to FIG. 2, FIG. 2 is a diagram of example components of a device 200. Device 200 may correspond to POS device 102, user device 104, and/or one or more devices of issuer system 106, one or more devices of transaction service provider system 108, and/or one or more devices of merchant system 110. In some non-limiting embodiments, POS device 102, user device 104, issuer system 106, transaction service provider system 108, and/or merchant system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
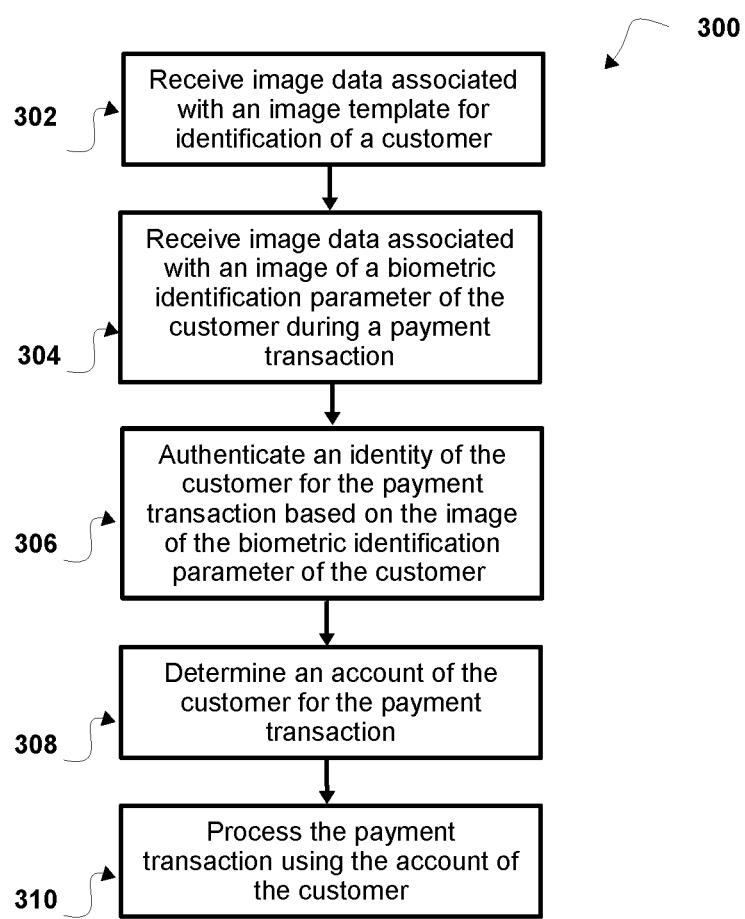
FIG. 3 is a flowchart illustrating a non-limiting embodiment of a method for authenticating a customer during a payment transaction based on a biometric identification parameter of the customer.

Referring now to FIG. 3, FIG. 3 is a flowchart of a non-limiting embodiment of a process 300 for authenticating a customer during a payment transaction based on a biometric identification parameter of the customer. In some non-limiting embodiments, one or more of the steps of process 300 may be performed (e.g., completely, partially, etc.) by POS device 102 (e.g., one or more devices of POS device 102). In some non-limiting embodiments, one or more of the steps of process 300 may be performed (e.g., completely, partially, etc.) by another device or a group of devices separate from or including POS device 102, such as user device 104, issuer system 106 (e.g., one or more devices of issuer system 106), transaction service provider system 108 (e.g., one or more devices of transaction service provider system 108), or merchant system 110 (e.g., one or more devices of merchant system 110).

As shown in FIG. 3, at step 302, process 300 includes receiving image data associated with an image template for identification of a customer. For example, POS device 102 may receive data associated with conducting a payment transaction that includes the image data associated with the image template for identification of a customer (e.g., a user, an individual, and/or the like) via a short-range communication connection (e.g., a Bluetooth® communication connection or a BLE communication connection) between user device 104 associated with the customer and POS device 102 associated with a merchant. In some non-limiting embodiments, the image template for identification of the customer may include an image of a face of the customer. For example, the image template for identification of the customer may include an image of the face of the customer captured using an image capture device of user device 104 associated with the customer.

Additionally or alternatively, the data associated with conducting the payment transaction may include data associated with an identifier (e.g., a first name, a last name, a first and last name, and/or the like) of the customer, data associated with a user account identifier (e.g., a username, a user account number, and/or the like) associated with a user account of the customer, account identifier data associated with an account identifier (e.g., a PAN, the last four digits of a PAN, and/or the like) of an account of the customer, image data associated with an image of a payment device (e.g., an image of a design of a payment device, an image of card art of a payment device, and/or the like) associated with the customer, and/or device identifier data associated with a device identifier of user device 104 associated with the customer. In some non-limiting embodiments, the device identifier of user device 104 associated with the customer may be a device identifier generated (e.g., by user device 104) via a mobile payment application stored on user device 104.

In some non-limiting embodiments, the image data associated with the image template (e.g., a facial image template) for identification of the customer comprises encrypted image data associated with an image template of the customer. In some non-limiting embodiments, the encrypted image data associated with the image template of the customer comprises data that has been encrypted using a homomorphic encryption scheme.

In some non-limiting embodiments, user device 104 may store the image template for identification of the customer, the identifier of the customer, the user account identifier of a user account of the customer, the account identifier of the account of the customer, the image of the payment device associated with the customer, and/or the device identifier of user device 104 on user device 104. In some non-limiting embodiments, user device 104 may store the image template for identification of the customer, the identifier of the customer, the user account identifier of a user account of the customer, the account identifier of the account of the customer, the image of the payment device associated with the customer, and/or the device identifier of user device 104 on a device remote from user device 104. In some non-limiting embodiments, user device 104 may store the image template for identification of the customer, the identifier of the customer, the user account identifier of a user account of the customer, the account identifier of the account of the customer, the image of the payment device associated with the customer, and/or the device identifier of user device 104 on user device 104 via a mobile payment application of user device 104.

In another example, the image template for identification of the customer, the identifier of the customer, the user account identifier of a user account of the customer, the account identifier of the account of the customer, the image of the payment device associated with the customer, and/or the device identifier of user device 104 may be stored on a server associated with transaction service provider system 108 or a server associated with issuer system 106. In such an example, user device 104 may retrieve the image template for identification of the customer, the identifier of the customer, the user account identifier of a user account of the customer, the account identifier of the account of the customer, the image of the payment device associated with the customer, and/or the device identifier of user device 104 from the server associated with transaction service provider system 108 or the server associated with issuer system 106 via a mobile payment application (e.g., a mobile payment application controlled or operated by an issuer associated with issuer system 106 or a transaction service provider associated with transaction service provider system 108) of user device 104.

In some non-limiting embodiments, POS device 102 may store the data associated with conducting a payment transaction received from user device 104. For example, POS device 102 may store the data associated with conducting a payment transaction based on receiving the data from user device 104. In some non-limiting embodiments, POS device 102 may store the image template for identification of the customer, the identifier of the customer, the user account identifier of a user account of the customer, the account identifier of the account of the customer, the image of the payment device associated with the customer, and/or the device identifier of user device 104. For example, POS device 102 may store the image template for identification of the customer, the identifier of the customer, the user account identifier of a user account of the customer, the account identifier of the account of the customer, the image of the payment device associated with the customer, and/or the device identifier of user device 104 based on receiving the data associated with conducting a payment transaction. In some non-limiting embodiments, POS device 102 may store the image template for identification of the customer, the identifier of the customer, the user account identifier of a user account of the customer, the account identifier of the account of the customer, the image of the payment device associated with the customer, and/or the device identifier of user device 104 for a predetermined time period (e.g., a time period of one minute, a time period of five minutes, a time period of ten minutes, and/or the like). Additionally, after expiration of the predetermined time period, POS device 102 may delete the image template for identification of the customer, the identifier of the customer, the user account identifier of a user account of the customer, the account identifier of the account of the customer, the image of the payment device associated with the customer, and/or the device identifier of user device 104.

In some non-limiting embodiments, POS device 102 may establish a short-range communication connection with user device 104 associated with the customer. For example, POS device 102 may establish the short-range communication connection with user device 104 when user device 104 is within a predetermined distance (e.g., a predetermined range for establishing a short-range communication) of POS device 102. In such an example, the predetermined distance may be between 2 meters and 3 meters. In some non-limiting embodiments, the short-range communication connection may be a Bluetooth® communication connection or a BLE communication connection. In some non-limiting embodiments, user device 104 may send data associated with conducting a payment transaction to POS device 102 via the short-range communication connection. For example, user device 104 may send the data associated with conducting a payment transaction to POS device 102 when user device 104 is within a predetermined distance of POS device 102.

In some non-limiting embodiments, POS device 102 may receive data associated with conducting a payment transaction from each of a plurality of user devices 104 associated with a plurality of customers. For example, POS device 102 may receive data associated with conducting a payment transaction from each of the plurality of user devices 104 via a plurality of short-range communication connections based on the plurality user devices 104 being within a predetermined distance of POS device 102.

In some non-limiting embodiments, POS device 102 may display a plurality of images of the plurality of customers associated with the plurality of user devices 104. For example, POS device 102 may display a plurality of images of the plurality of customers associated with the plurality of user devices 104 on a graphical user interface (GUI) of POS device 102. In some non-limiting embodiments, POS device 102 may display a plurality of identifiers associated with the customers along with the plurality of images of the plurality of customers. In some non-limiting embodiments, POS device 102 may receive a selection of the customer associated with user device 104 based on input provided by a merchant representative associated with POS device 102. In some non-limiting embodiments, POS device 102 may automatically select the customer associated with user device 104 out of the plurality of user devices. In some non-limiting embodiments, POS device 102 may establish a short-range communication connection with user device 104 associated with the customer that was included in the selection.

In some non-limiting embodiments, POS device 102 may send a payment transaction notification to user device 104 associated with the customer based on establishing the short-range communication connection with user device 104. In some non-limiting embodiments, the payment transaction notification may include an identifier of a merchant associated with POS device 102 and/or a transaction amount associated with the payment transaction. In some non-limiting embodiments, user device 104 may receive the payment transaction notification as a push notification.

In some non-limiting embodiments, user device 104 may send data associated with conducting a payment transaction to POS device 102 via the short-range communication connection based on a state of a mobile payment application of user device 104. For example, user device 104 may send the data associated with conducting a payment transaction to POS device 102 based on the mobile payment application of user device 104 being in an activate state. In such an example, user device 104 may send the data to POS device 102 only if the mobile payment application of user device 104 is in an activate state. Additionally or alternatively, user device 104 may send the data associated with conducting a payment transaction to POS device 102 based on a state of short-range communication connection capability of user device 104. For example, user device 104 may send the data associated with conducting a payment transaction to POS device 102 based on the short-range communication connection capability (e.g., a Bluetooth® communication connection capability or a BLE communication connection capability) of user device 104 being in an active state. In such an example, user device 104 may send the data to POS device 102 only if the short-range communication connection capability of user device 104 is in an active state.

In some non-limiting embodiments, POS device 102 may receive the data associated with conducting a payment transaction based on user device 104 sending the data to POS device 102. In some non-limiting embodiments, user device 104 may communicate the data associated with conducting a payment transaction to POS device 102 based on receiving a signal (e.g., a beacon signal) from POS device 102. For example, user device 104 may communicate the data to POS device 102 based on receiving a signal from a beacon of POS device 102.

In some non-limiting embodiments, issuer system 106, transaction service provider system 108, and/or merchant system 110 may receive the data associated with conducting a payment transaction from POS device 102. For example, issuer system 106, transaction service provider system 108, and/or merchant system 110 may receive the data from POS device 102 after user device 104 associated with the customer communicates the data to POS device 102.

In some non-limiting embodiments, user device 104 may receive enrollment data associated with an enrollment request to enroll the customer in a mobile payment application. For example, user device 104 may receive data associated with conducting a payment transaction to enroll the customer in the mobile payment application. In some non-limiting embodiments, issuer system 106 and/or transaction service provider system 108 may receive the data associated with conducting a payment transaction from user device 104 based on the enrollment request. Issuer system 106 and/or transaction service provider system 108 may create a user account associated with the customer based on receiving the data associated with conducting a payment transaction and store the data in the user account associated with the customer.

In some non-limiting embodiments, user device 104 may display a prompt for the customer associated with user device 104 to provide enrollment data associated with an enrollment request to enroll the customer in the mobile payment application when the user device 104 is within a predetermined distance of POS device 102. In some non-limiting embodiments, user device 104 may download the mobile payment application and user device 104 may display the prompt for the customer associated with user device 104 to provide the enrollment data associated with the enrollment request based on downloading the mobile payment application.

In some non-limiting embodiments, POS device 102 may determine whether the data associated with conducting a payment transaction is received by POS device 102. For example, POS device 102 may determine whether image data associated with the image template for identification of the customer, data associated with an identifier of the customer, image data associated with an image template for identification of the customer, account identifier data associated with an account identifier of an account of the customer, and/or device identifier data associated with a device identifier of user device 104 associated with the customer is received by POS device 102 within a predetermined time period after the short-range communication connection is established. If POS device 102 determines that the data associated with conducting a payment transaction is not received by POS device 102, POS device 102 may send a message to user device 104 that includes an indication that the data associated with conducting a payment transaction has not been received from user device 104.

As further shown in FIG. 3, at step 304, process 300 includes receiving image data associated with an image of a biometric identification parameter of the customer during a payment transaction. For example, POS device 102 may receive image data associated with an image of a biometric identification parameter of the customer during a payment transaction. In some non-limiting embodiments, the image of the biometric identification parameter of the customer may include an image of a face of the customer (e.g., an image of an entire face of the customer, an image of a portion of a face of the customer, and/or the like), an image of a feature of the face (e.g., a nose of the face, an eye of the face, and/or the like) of the customer, and/or the like.

In some non-limiting embodiments, POS device 102 may cause an image of the biometric identification parameter of the customer to be captured via an image capture device. For example, POS device 102 may cause the image of the biometric identification parameter of the customer to be captured via the image capture device during the payment transaction. In some non-limiting embodiments, POS device 102 may receive the image of the biometric identification parameter of the customer from the image capture device. For example, POS device 102 may receive the image data associated with the image of the biometric identification parameter of the customer from the image capture device after the image capture device captures the image of the biometric identification parameter.

In some non-limiting embodiments, POS device 102 may establish a short-range communication connection with user device 104 associated with the customer based on POS device 102 receiving the image data associated with the image of the biometric identification parameter of the customer during the payment transaction. For example, POS device 102 may establish the short-range communication connection with user device 104 when user device 104 is within a predetermined distance of POS device 102 after POS device 102 receives the image data associated with the image of the biometric identification parameter of the customer. In some non-limiting embodiments, user device 104 may send data associated with conducting the payment transaction to POS device 102 via the short-range communication connection based on establishing the short-range communication connection.

In some non-limiting embodiments, POS device 102 may receive data associated with conducting a payment transaction from each of a plurality of user devices 104 associated with a plurality of customers after POS device 102 receives the image data associated with the image of the biometric identification parameter of the customer. For example, POS device 102 may receive the data associated with conducting a payment transaction from each of the plurality user devices 104 via a plurality of short-range communication connections between POS device 102 and user devices 104 based on the plurality user devices 104 being within a predetermined distance of POS device 102 after POS device 102 receives the image data associated with the image of the biometric identification parameter of the customer.

In some non-limiting embodiments, POS device 102 may display a plurality of images of the plurality of customers associated with the plurality of user devices 104 based on the data associated with conducting a payment transaction that is received by POS device 102 from each of the plurality of user devices 104 associated with the plurality of customers. For example, POS device 102 may display the plurality of images of the plurality of customers associated with the plurality of user devices 104 on a graphical user interface (GUI) of POS device 102. In some non-limiting embodiments, POS device 102 may display a plurality of identifiers associated with the customers along with the plurality of images of the plurality of customers. In some non-limiting embodiments, POS device 102 may receive a selection of the customer associated with user device 104 based on input provided by a merchant representative associated with POS device 102. In some non-limiting embodiments, POS device 102 may automatically select the customer associated with user device 104 out of the plurality of user devices. In some non-limiting embodiments, POS device 102 may establish a short-range communication connection with user device 104 associated with the customer that was included in the selection.

As further shown in FIG. 3, at step 306, process 300 includes authenticating an identity of the customer for the payment transaction based on the image of the biometric identification parameter of the customer. For example, POS device 102 may authenticate the identity of the customer for the payment transaction based on the image of the biometric identification parameter of the customer. In some non-limiting embodiments, POS device 102 may determine whether the image of the biometric identification parameter of the customer corresponds to identity data associated with the identity of the customer. For example, POS device 102 may determine whether the image of the biometric identification parameter of the customer corresponds to an image template for identification of the customer. In such an example, POS device 102 may determine whether an image of a face of the customer corresponds to a facial image template of the customer. In some non-limiting embodiments, POS device 102 may determine whether the image of the biometric identification parameter of the customer corresponds to an image template for identification of the customer using machine learning techniques and/or template matching techniques.

In some non-limiting embodiments, POS device 102 may authenticate the identity of the customer for the payment transaction based on homomorphic encryption. As used herein, the term "Homomorphic encryption" is intended to refer to a form of encryption that allows computational operations on ciphertext. In some non-limiting embodiments, such a computational operation may include generating an encrypted result by performing computational operations on encrypted information (e.g., ciphertext) so that when the encrypted result of the computational operations is decrypted, the decrypted result matches a result of the computational operations as if the computational operations had been performed on plaintext associated with ciphertext (e.g., the plaintext that was used to produce the ciphertext). Thus, one or more encrypted templates and/or one or more encrypted images (e.g., one or more templates for identification of a customer that have been encrypted, one or more images of a biometric identification parameter of a customer that have been encrypted, and/or the like) may be used to generate an encrypted result, that when decrypted, matches the result of operations as if the operations had been performed on one or more unencrypted templates. Accordingly, encrypted results may be passed between devices and/or software applications (e.g., mobile applications) being run on one or more devices and a device that receives the encrypted results may decrypt the encrypted results and use the encrypted results and/or decrypted results for authenticating an identity of a customer as described herein. Examples of homomorphic encryption are disclosed in International Patent Application No. PCT/US2016/058880, filed on Oct. 26, 2016, and International Patent Application No. PCT/US2017/024099, filed on Mar. 24, 2017, each of which is incorporated by reference herein. In some non-limiting embodiments, the techniques discussed herein that involve homomorphic encryption may be performed in combination with techniques that involve establishing a short-range communication connection and communicating information via the short-range communication connection. In other non-limiting embodiments, the techniques discussed herein that involve homomorphic encryption may be performed without performing the techniques that involve establishing a short-range communication connection and communicating information via the short-range communication connection.

In some non-limiting embodiments, POS device 102 may determine whether the image of the biometric identification parameter of the customer corresponds to the image template for identification of the customer by comparing the image of the biometric identification parameter of the customer to the image template for identification of the customer. In one example, POS device 102 may receive device identifier data associated with a device identifier of user device 104 associated with the customer after receiving image data associated with the image of the biometric identification parameter of the customer. POS device 102 may retrieve the image template for identification of the customer from a data structure (e.g., a data structure of POS device 102, a data structure of transaction service provider system 108, and/or the like) based on the device identifier of user device 104. POS device may compare the image template for identification of the customer to the image of the biometric identification parameter of the customer based on retrieving the image template.

In some non-limiting embodiments, if POS device 102 determines that the image of the biometric identification parameter of the customer corresponds to the identity data associated with the identity of the customer, POS device 102 may authenticate the identity of the customer. For example, if POS device 102 determines that the image of the biometric identification parameter of the customer corresponds to the image template for identification of the customer, POS device 102 may authenticate the identity of the customer. In some non-limiting embodiments, if POS device 102 determines that the image of the biometric identification parameter of the customer does not correspond to the identity data associated with the identity of the customer, POS device 102 may not authenticate the identity of the customer. For example, if POS device 102 determines that the image of the biometric identification parameter of the customer does not correspond to the image template for identification of the customer, POS device 102 may not authenticate the identity of the customer.

In some non-limiting embodiments, POS device 102 may establish a short-range communication connection (e.g., a second short-range communication connection established after a first short-range communication connection via which image data associated with an image template for identification of a customer was received by POS device 102) with user device 104 associated with the customer during a payment transaction between the customer and a merchant. In some non-limiting embodiments, POS device 102 may authenticate the identity of the customer for the payment transaction based on the image of the biometric identification parameter of the customer via the short-range communication connection.

In some non-limiting embodiments, POS device 102 may receive account identifier data associated with an account identifier of an account of the customer, image data associated with an image of a payment device, and/or transaction code data associated with a transaction code (e.g., a transaction code associated with a card-present payment transaction) for the payment transaction between the customer and the merchant based on POS device 102 authenticating the identity of the customer associated with user device 104. For example, POS device 102 may receive image data associated with an image of a payment device associated with the customer, a token associated with an account of the customer, and/or a cryptogram from user device 104.

In some non-limiting embodiments, POS device 102 may authenticate the identity of the customer based on a response (e.g., a payment transaction notification response) to a payment transaction notification received from user device 104 associated with the customer. For example, POS device 102 may send a payment transaction notification to user device 104 associated with the customer based on establishing the short-range communication connection with user device 104. User device 104 may receive the payment transaction notification and user device 104 may display the payment transaction notification. User device 104 may receive an input provided by the customer as the response to the payment transaction notification. The input may include an authentication parameter. In some non-limiting embodiments, the authentication parameter may include a personal identification number (PIN). Additionally or alternatively, the authentication parameter may include a biometric authentication parameter such as a fingerprint of the customer.

In some non-limiting embodiments, POS device 102 may determine whether the image of the biometric identification parameter of a customer corresponds to an image template for identification of the customer by comparing the image of the biometric identification parameter of the customer to each of a plurality of image templates for identification of a customer. For example, POS device 102 may receive a plurality of image templates for identification of a customer from a plurality of user devices 104 associated with a plurality of customers. After receiving the plurality of image templates, POS device 102 may receive the image of the biometric identification parameter of the customer. POS device 102 may compare the image of the biometric identification parameter of the customer to each of the plurality of image templates to determine whether the image of the biometric identification parameter of the customer corresponds to the image template for identification of the customer. In some non-limiting embodiments, POS device 102 may authenticate the identity of the customer based on determining that the biometric identification parameter of the customer best corresponds to the image template for identification of the customer out of the plurality of image templates.

As further shown in FIG. 3, at step 308, process 300 includes determining an account of the customer for the payment transaction. For example, POS device 102 may determine the account of the customer for processing of the payment transaction. In some non-limiting embodiments, POS device 102 may determine an account identifier of the account of the customer for processing of the payment transaction. For example, POS device 102 may display an image of a payment device associated with the customer. POS device 102 may receive an indication that the customer authorizes the use of an account associated with the payment device. POS device 102 may determine an account identifier (e.g., a PAN, a token, and/or the like) of the account associated with the payment device based on receiving the indication that the customer authorizes the use of the account associated with the payment device for the payment transaction.

In some non-limiting embodiments, POS device 102 may determine the account of the customer for processing of the payment transaction based on receiving account identifier data associated with an account identifier of the account of the customer. For example, POS device 102 may determine the account of the customer for processing of the payment transaction based on receiving account identifier data associated with an account identifier of the account of the customer from user device 104 associated with the customer. In some non-limiting embodiments, POS device 102 may determine the account of the customer for processing of the payment transaction based on retrieving account identifier data associated with the account identifier of the account of the customer from a data structure associated with POS device 102.

In some non-limiting embodiments, POS device 102 may display the image of the payment device associated with the customer based on receiving the image data associated with the image of the payment device from user device 104 associated with the customer. Additionally or alternatively, POS device 102 may display a transaction amount of the payment transaction. For example, POS device 102 may display the transaction amount of the payment transaction based on POS device 102 scanning a plurality of products involved in the payment transaction.

In some non-limiting embodiments, POS device 102 may receive authorization data associated with an indication that the customer authorizes the payment transaction. For example, POS device 102 may receive authorization data associated with an indication that the customer authorizes the payment transaction involving an account associated with a payment device of the customer after POS device 102 displays an image of a payment device associated with the customer. In some non-limiting embodiments, POS device 102 may receive the authorization data from user device 104, issuer system 106, transaction service provider system 108, and/or merchant system 110. In some non-limiting embodiments, the authorization data may include an indication that the customer authorizes the payment transaction based on a transaction amount of the payment transaction. For example, the authorization data may include an indication that the customer authorizes the payment transaction based on a threshold value of a transaction amount of the payment transaction.

In some non-limiting embodiments, POS device 102 may receive the authorization data associated with the indication that the customer authorizes the payment transaction. For example, POS device 102 may receive the authorization data from merchant system 110 based on receiving a user input from the GUI screen of POS device 102. In such an example, the GUI screen may include a plurality of user interface elements and the user input may be received based on the customer interacting with one or more of the user interface elements. In some non-limiting embodiments, POS device 102 may communicate the authorization data to issuer system 106, transaction service provider system 108, and/or merchant system 110 based on receiving the authorization data.

In some non-limiting embodiments, POS device 102 may receive the authorization data associated with the indication that the customer authorizes the payment transaction before, during, and/or after POS device 102 determines an identity of a customer. In some non-limiting embodiments, POS device 102 may receive the authorization data associated with the indication that the customer authorizes the payment transaction before, during, and/or after POS device 102 receives identity data associated with an identity of the customer (e.g., image data associated with an image template for identification of the customer).

In some non-limiting embodiments, POS device 102 may display an image associated with a payment device. For example, POS device 102 may display an image associated with a payment device based on determining the account identifier of the account of the customer. In some non-limiting embodiments, the payment device is associated with the account identifier of the account of the customer. In some non-limiting embodiments, POS device 102 may receive an indication that the account identifier of the account of the customer is to be used during processing of the payment transaction. For example, POS device 102 may receive the indication after displaying the image associated with the payment device.

As further shown in FIG. 3, at step 310, process 300 includes processing the payment transaction using the account of the customer. For example, POS device 102 may process the payment transaction using the account of the customer based on POS device 102 determining the account of the customer for processing the payment transaction. In some non-limiting embodiments, POS device 102 may generate an authorization request message for the payment transaction and send the authorization request message to issuer system 106, transaction service provider system 108, and/or merchant system 110. The authorization request message may include a request to the issuer that issued the account of the customer involved in the payment transaction, to authorize the payment transaction. In some non-limiting embodiments, POS device 102 may receive an authorization response message from issuer system 106, transaction service provider system 108, and/or merchant system 110. The authorization response message may include a response indicating whether the issuer that issued the account of the customer involved in the payment transaction, authorized the payment transaction.

In some non-limiting embodiments, POS device 102 may determine whether to process the payment transaction based on a response (e.g., a payment transaction notification response) to a payment transaction notification received from user device 104 associated with the customer. For example, POS device 102 may send a payment transaction notification to user device 104 associated with the customer based on establishing the short-range communication connection with user device 104. User device 104 may receive the payment transaction notification and user device 104 may display the payment transaction notification. User device 104 may receive an input provided by the customer as the response to the payment transaction notification. If POS device 102 determines that the input provided by the customer as the response to the payment transaction notification includes an authentication parameter (e.g., an indication that the account identifier of the account of the customer is to be used during processing of the payment transaction), POS device 102 may determine to process the payment transaction involving the customer. If POS device 102 determines that the input provided by the customer as the response to the payment transaction notification does not include an authentication parameter, POS device 102 may determine not to process the payment transaction involving the customer. In some non-limiting embodiments, if POS device 102 determines that the input was not provided by the customer as the response to the payment transaction notification (e.g., within a predetermined time period), POS device 102 may determine not to process the payment transaction involving the customer.

In some non-limiting embodiments, POS device 102 may send a payment transaction authorization request message to user device 104 associated with the customer. For example, POS device 102 may send a payment transaction authorization request message to user device 104 based on authenticating an identity of the customer for a payment transaction and/or determining an account of the customer for the payment transaction. In some non-limiting embodiments, the payment transaction authorization request message comprises a transaction amount of the payment transaction. In some non-limiting embodiments, POS device 102 may receive a payment transaction authorization response message from user device 104 associated with the customer. In some non-limiting embodiments, the payment transaction authorization request message comprises authorization data associated with an indication that the customer authorizes the transaction amount of the payment transaction. In some non-limiting embodiments, POS device 102 may process the payment transaction using the account of the customer based on receiving the payment transaction authorization request message. For example, POS device 102 may receive the payment transaction authorization request message and POS device 102 may determine that the payment transaction authorization request message includes authorization data associated with an indication that the customer authorizes the transaction amount of the payment transaction. POS device 102 may process the payment transaction based on the authorization data.

Figure 4:
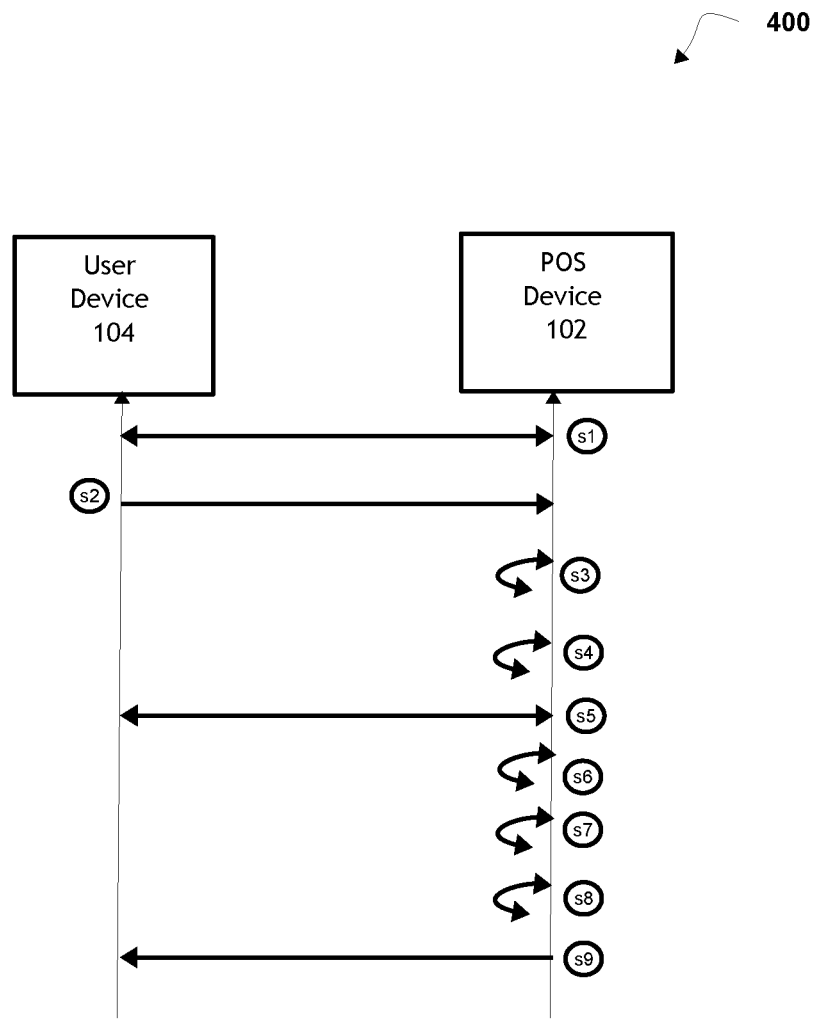
FIG. 4 is a sequence diagram of a non-limiting embodiment of the process shown in FIG. 3.

Referring now to FIG. 4, FIG. 4 is a sequence diagram of a non-limiting embodiment of a process 400 for authenticating a customer during a payment transaction based on a biometric identification parameter of the customer. As shown, one or more of the steps of process 400 are performed (e.g., completely, partially, and/or the like) by POS device 102 and user device 104. Additionally or alternatively, one or more of the steps of process 400 may be performed (e.g., completely, partially, and/or the like) by another device or a group of devices separate from or including POS device 102 and user device 104, such as for example, one or more devices of issuer system 106, transaction service provider system 108, and/or merchant system 110.

As shown in FIG. 4, at step s1, POS device 102 may establish a first short-range communication connection with user device 104 associated with a customer. In some non-limiting embodiments, the first short-range communication connection may be a Bluetooth® communication connection or BLE communication connection. At step s2, user device 104 may send data associated with conducting a payment transaction via the first short-range communication connection. In some non-limiting embodiments, the data associated with conducting a payment transaction includes image data associated with the image template for identification of the customer, data associated with an identifier of the customer, data associated with a user account identifier for a user account of the customer, account identifier data associated with an account identifier of an account of the customer, image data associated with an image of a payment device associated with the customer, and/or device identifier data associated with a device identifier of user device 104 associated with the customer.

As further shown in FIG. 4, at step s3, POS device 102 may receive data associated with a payment transaction involving the customer. For example, POS device 102 may receive data associated with one or more products involved in the payment transaction based on POS device 102 scanning one or more packages of the one or more products via a scanning device associated with POS device 102. At step s4, POS device 102 may receive image data associated with an image of a biometric identification parameter of the customer during the payment transaction. In some non-limiting embodiments, POS device 102 may receive the image data associated with the image of the biometric identification parameter of the customer based on causing the image of at least a portion of the face of the customer to be captured via an image capture device and POS device 102 may receive the image of at least a portion of the face of the customer from the image capture device.

As further shown in FIG. 4, at step s5, POS device 102 may establish a second short-range communication connection with user device 104 associated with the customer. In some non-limiting embodiments, the second short-range communication connection may be a Bluetooth® communication connection or a BLE communication connection. At step s6, POS device 102 may authenticate the identity of the customer for the payment transaction based on the image of the biometric identification parameter of the customer. For example, POS device 102 may determine whether the image of the biometric identification parameter of the customer corresponds to the image template for identification of the customer.

As further shown in FIG. 4, at step s7, POS device 102 may determine an account of the customer to be used during processing of the payment transaction. At step s8, POS device 102 may process the payment transaction using the account of the customer. At step s9, POS device 102 may send a transaction confirmation message to user device 104 associated with the customer. In some non-limiting embodiments, the transaction confirmation message may include an indication that the payment transaction involving the customer was processed based on processing the payment transaction.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
generating device identifier data via a mobile application of a user device of a customer;
generating image template data associated with a facial image template for the customer via the mobile application of the user device of the customer;
storing the device identifier data and the image template data on the user device of the customer via the mobile application;
receiving, with at least one processor of a point-of-sale (POS) device of a merchant system of a merchant, the device identifier data and the image template data from the user device when the user device is within range of the POS device to establish a wireless communication connection, wherein receiving the device identifier data and the image template data from the user device comprises receiving the device identifier data and the image template data from the user device without the customer providing an input to the user device to cause the user device to transmit the device identifier data and the image template data from the user device to the POS device of the merchant system;
storing, with the at least one processor of the POS device, the device identifier data and the image template data in a data structure of the merchant system of the merchant for a time period;
causing, with the at least one processor of the POS device, an image of the customer to be captured via an image capture device of the merchant system during a payment transaction between the customer and the merchant;
displaying, with the at least one processor of the POS device, a plurality of images of the plurality of customers associated with a plurality of user devices on a graphical user interface (GUI) of the POS device;
selecting, with the at least one processor of the POS device, the customer associated with the user device out of the plurality of customers associated with the plurality of user devices;
authenticating, with the at least one processor of the POS device, an identity of the customer for the payment transaction, wherein authenticating the identity of the customer for the payment transaction comprises:
receiving, with the at least one processor of the POS device, the device identifier data from the user device;
retrieving, with the at least one processor of the POS device, an image template from the data structure based on the device identifier data; and
determining, with the at least one processor of the POS device, whether the image corresponds to the image template;
determining, with the at least one processor of the POS device, an account identifier of the customer based on authenticating the identity of the customer for the payment transaction;
sending a payment transaction authorization request message to the user device of the customer based on determining the account identifier of the customer, wherein the payment transaction authorization request message comprises transaction data associated with the payment transaction;

receiving a payment transaction authorization response message from the user device associated with the customer, wherein the payment transaction authorization response message comprises authorization data associated with an indication that the customer authorizes the payment transaction;

sending a transaction confirmation message to the user device of the customer, wherein the transaction confirmation message includes an indication that the payment transaction between the customer and the merchant was processed; and deleting, with the at least one processor of the POS device, the device identifier data and the image template from the data structure of the merchant system after expiration of the time period.

2. The computer-implemented method according to claim 1, wherein the device identifier data is first device identifier data, and the method further comprises:

receiving the image during the payment transaction between the customer and the merchant;

establishing a short-range communication connection between the user device and the POS device associated with the merchant during the payment transaction between the customer and the merchant;

receiving second device identifier data from the user device via the short-range communication connection; and determining that the first device identifier data corresponds to the second device identifier data.

3. The computer-implemented method according to claim 2, wherein establishing the short-range communication connection between the user device and the POS device comprises:

establishing the short-range communication connection between the user device and the POS device based on the user device being within a predetermined distance of the POS device.

4. The computer-implemented method according to claim 1, further comprising:

displaying an image associated with a payment device, wherein the payment device is associated with the account identifier of the customer; and receiving an indication that the account identifier of the customer is to be used during processing of the payment transaction after displaying the image associated with the payment device.

5. The computer-implemented method according to claim 4, further comprising:

processing the payment transaction using the account identifier of the customer based on receiving the indication that the account identifier of the customer is to be used during processing of the payment transaction.

6. The computer-implemented method according to claim 1, further comprising:

sending a payment transaction authorization request message to the user device; and receiving a payment transaction authorization response message from the user device.

7. The computer-implemented method according to claim 1, wherein causing the image to be captured via the image capture device comprises:

causing an image of at least a portion of a face of the customer to be captured via the image capture device, wherein receiving the image comprises:

receiving the image of at least a portion of the face of the customer from the image capture device at the POS device associated with the merchant.

8. The computer-implemented method according to claim 1, wherein the image template comprises encrypted facial image template data, and the computer-implemented method further comprises:

receiving the encrypted facial image template data from the user device, wherein the encrypted facial image template data comprises data that has been encrypted using a homomorphic encryption scheme.

9. A system, comprising:

at least one processor programmed or configured to:
generate device identifier data via a mobile application of a user device of a customer;
generate image template data associated with a facial image template for the customer via the mobile application of the user device of the customer;
store the device identifier data and the image template data on the user device of the customer via the mobile application;

at least one processor of a point-of-sale (POS) device of a merchant system of a merchant, wherein the at least one processor of the POS device is programmed or configured to:
receive the device identifier data and the image template data from the user device when the user device is within range of the POS device to establish a wireless communication connection, wherein, when receiving the device identifier data and the image template data from the user device, the at least one processor of the POS device is programmed or configured to:
receive the device identifier data and the image template data from the user device without the customer providing an input to the user device to cause the user device to transmit the device identifier data and the image template data from the user device to the POS device of the merchant system;
store the device identifier data and the image template data in a data structure of the merchant system of the merchant for a time period;
cause an image of the customer to be captured via an image capture device of the merchant system during a payment transaction between the customer and the merchant;
display a plurality of images of the plurality of customers associated with a plurality of user devices on a graphical user interface (GUI) of the POS device;
select the customer associated with the user device out of the plurality of customers associated with the plurality of user devices;
authenticate an identity of the customer for the payment transaction, wherein, when authenticating the identity of the customer for the payment transaction the at least one processor of the POS device is programmed or configured to:
receive the device identifier data from the user device;
retrieve an image template from the data structure based on the device identifier data; and
determine whether the image corresponds to the image template;
determine an account identifier of the customer based on authenticating the identity of the customer for the payment transaction;

send a payment transaction authorization request message to the user device of the customer based on determining the account identifier of the customer, wherein the payment transaction authorization request message comprises transaction data associated with the payment transaction;

receive a payment transaction authorization response message from the user device associated with the customer, wherein the payment transaction authorization response message comprises authorization data associated with an indication that the customer authorizes the payment transaction;

send a transaction confirmation message to the user device of the customer, wherein the transaction confirmation message includes an indication that the payment transaction between the customer and the merchant was processed; and delete the device identifier data and the image template from the data structure of the merchant system after expiration of the time period.

10. The system according to claim 9, wherein the device identifier data is first device identifier data, and wherein the at least one processor is further programmed or configured to:

receive the image during the payment transaction between the customer and the merchant;

establish a short-range communication connection between the user device and the POS device associated with the merchant during the payment transaction between the customer and the merchant;

receive second device identifier data from the user device via the short-range communication connection; and determine that the first device identifier data corresponds to the second device identifier data.

11. The system according to claim 10, wherein, when establishing the short-range communication connection between the user device and the POS device, the at least one processor is programmed or configured to:

establish the short-range communication connection between the user device and the POS device based on the user device being within a predetermined distance of the POS device.

12. The system according to claim 9, wherein the at least one processor is further programmed or configured to:

display an image associated with a payment device, wherein the payment device is associated with the account identifier of the customer; and receiving an indication that the account identifier of the customer is to be used during processing of the payment transaction after displaying the image associated with the payment device.

13. The system according to claim 12, wherein the at least one processor is further programmed or configured to:

process the payment transaction using the account identifier of the customer based on receiving the indication that the account identifier of the customer is to be used during processing of the payment transaction.

14. The system according to claim 9, wherein the image template comprises encrypted data associated with a facial image template of the customer, and wherein, the at least one processor is further programmed or configured to:

receive the encrypted data associated with the facial image template from the user device, wherein the encrypted data associated with the facial image template comprises data that has been encrypted using a homomorphic encryption scheme.

15. A computer program product, the computer program product comprising at least one non-transitory computer-readable medium including one or more instructions that, when executed by at least one processor, cause the at least one processor to:

generate device identifier data via a mobile application of a user device of a customer;

generate image template data associated with a facial image template for the customer via the mobile application of the user device of the customer;

store the device identifier data and the image template data on the user device of the customer via the mobile application;

wherein the at least one non-transitory computer-readable medium including one or more instructions that, when executed by at least one processor of a point-of-sale (POS) device of a merchant system of a merchant, cause the at least one processor of the POS device to:

receive the device identifier data and the image template data from the user device when the user device is within range of the POS device to establish a wireless communication connection, wherein, the one or more instructions that cause the at least one processor of the POS device to receive the device identifier data and the image template data from the user device, cause the at least one processor of the POS device to:

receive the device identifier data and the image template data from the user device without the customer providing an input to the user device to cause the user device to transmit the device identifier data and the image template data from the user device to the POS device of the merchant system;

store the device identifier data and the image template data in a data structure of a merchant system of a merchant for a time period;

cause an image of the customer to be captured via an image capture device of the merchant system during a payment transaction between the customer and the merchant;

display a plurality of images of the plurality of customers associated with a plurality of user devices on a graphical user interface (GUI) of the POS device;

select the customer associated with the user device out of the plurality of customers associated with the plurality of user devices;

authenticate an identity of the customer for the payment transaction, wherein, the one or more instructions that cause the at least one processor of the POS device to authenticate the identity of the customer for the payment transaction, cause the at least one processor of the POS device to:

receive the device identifier data from the user device;

retrieve an image template from the data structure based on the device identifier data; and determine whether the image corresponds to the image template;

determine an account identifier of the customer based on authenticating the identity of the customer for the payment transaction;

send a payment transaction authorization request message to the user device of the customer based on determining the account identifier of the customer, wherein the payment transaction authorization request message comprises transaction data associated with the payment transaction;

receive a payment transaction authorization response message from the user device associated with the customer, wherein the payment transaction authorization response message comprises authorization data associated with an indication that the customer authorizes the payment transaction;

send a transaction confirmation message to the user device of the customer, wherein the transaction confirmation message includes an indication that the payment transaction between the customer and the merchant was processed; and delete the device identifier data and the image template from the data structure of the merchant system after expiration of the time period.

16. The computer program product according to claim 15, wherein the device identifier data is first device identifier data, and wherein the one or more instructions further cause the at least one processor to:

receive the image during the payment transaction between the customer and the merchant;

establish a short-range communication connection between the user device and the POS device associated with the merchant during the payment transaction between the customer and the merchant;

receive second device identifier data from the user device via the short-range communication connection; and determine that the first device identifier data corresponds to the second device identifier data.

17. The computer program product according to claim 16, wherein, the one or more instructions that cause the at least one processor to establish the short-range communication connection between the user device and the POS device, cause the at least one processor to:

establish the short-range communication connection between the user device and the POS device based on the user device being within a predetermined distance of the POS device.

18. The computer program product according to claim 15, wherein, the one or more instructions that cause the at least one processor to cause the image of the customer to be captured via the image capture device, cause the at least one processor to:

cause an image of at least a portion of a face of the customer to be captured via the image capture device;

wherein, the one or more instructions that cause the at least one processor to receive the image of the customer, cause the at least one processor to:

receive the image of at least a portion of the face of the customer from the image capture device.

19. The computer program product according to claim 15, wherein the image template comprises encrypted data associated with a facial image template of the customer, and wherein the one or more instructions further cause the at least one processor to:

receive the encrypted data associated with the facial image template from the user device, wherein the encrypted data associated with the facial image template comprises data that has been encrypted using a homomorphic encryption scheme.

* * * * *